United States Patent
Mortimer

(10) Patent No.: US 8,651,362 B2
(45) Date of Patent: Feb. 18, 2014

(54) BRAZE JOINING OF WORKPIECES

(75) Inventor: John Justin Mortimer, Genesee, WI (US)

(73) Assignee: Radyne Corporation, Milwaukee, WI (US)

( * ) Notice: Subject to any disclaimer, the term of this patent is extended or adjusted under 35 U.S.C. 154(b) by 0 days.

(21) Appl. No.: 12/719,738

(22) Filed: Mar. 8, 2010

(65) Prior Publication Data
US 2010/0224672 A1 Sep. 9, 2010

Related U.S. Application Data

(60) Provisional application No. 61/221,053, filed on Jun. 27, 2009, provisional application No. 61/158,381, filed on Mar. 8, 2009.

(51) Int. Cl.
*B23K 1/20* (2006.01)
(52) U.S. Cl.
USPC ............................ 228/165; 228/170; 228/245
(58) Field of Classification Search
USPC .................................. 228/254, 165, 170, 245
See application file for complete search history.

(56) References Cited

U.S. PATENT DOCUMENTS 3,019,512 A * 2/1962 Stalker .......................... 29/889.2
6,705,510 B1 * 3/2004 Sims .............................. 228/175

FOREIGN PATENT DOCUMENTS

| JP | 02-142674 A | 5/1990 |
| JP | 05-277721 A | 10/1993 |
| JP | 2001-87853 A | 4/2001 |
| KR | 2000-0073194 A | 12/2000 |

* cited by examiner

*Primary Examiner* — Nicholas P D'Aniello
(74) *Attorney, Agent, or Firm* — Philip O. Post

(57) ABSTRACT

A braze joint is made between two workpieces by first forming a thermal shrink fit region between the two workpieces adjacent to, or around, a braze or filler region in which a filler metal is located adjacent to, or within. The filler metal is suitably heated so that it flows in the braze or filler region to form the braze joint of the two workpieces. Cutouts may be formed in the thermal shrink fit region adjacent to the braze or filler region to extend the braze joint region or provide paths for gas byproducts in the brazing process.

2 Claims, 7 Drawing Sheets

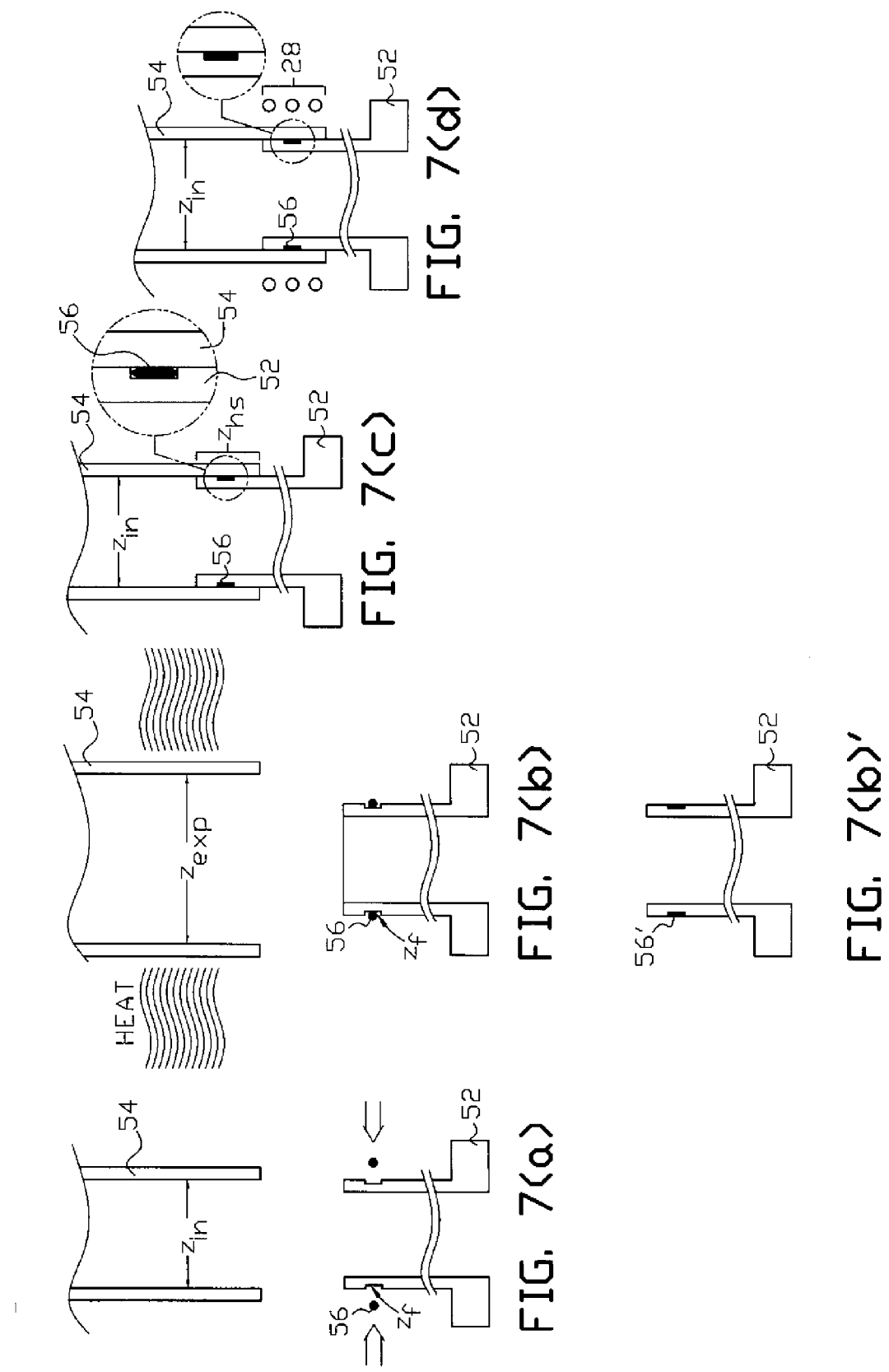

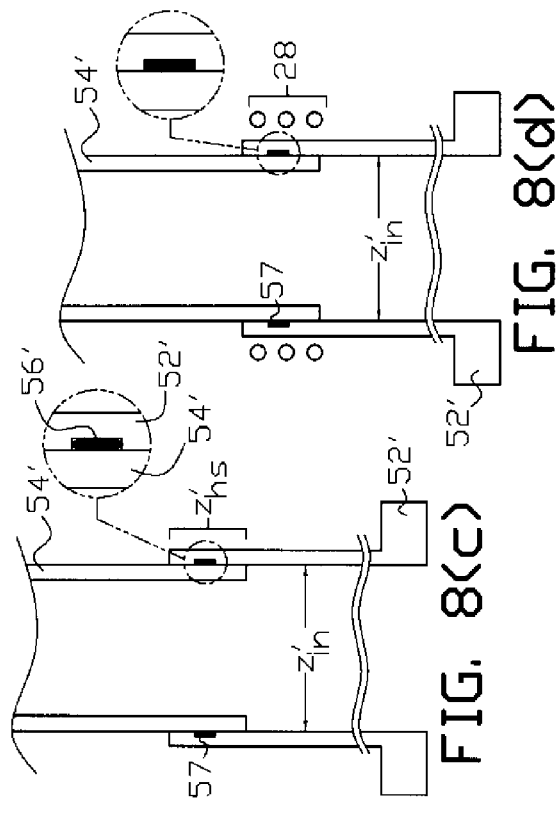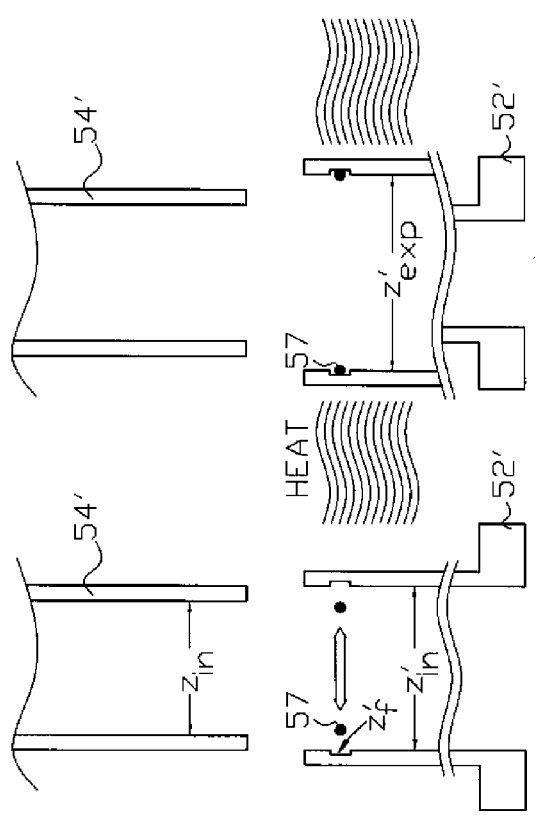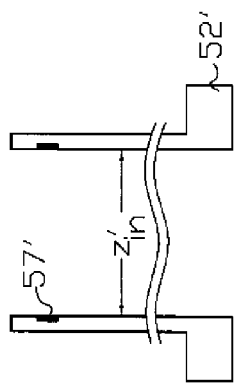

BRAZE JOINING OF WORKPIECES

CROSS-REFERENCE TO RELATED APPLICATIONS

This application claims the benefit of U.S. Provisional Application No. 61/158,381, filed Mar. 8, 2009, and U.S. Provisional Application No. 61/221,053, filed Jun. 27, 2009, both of which are hereby incorporated by reference in their entireties.

FIELD OF THE INVENTION

The present invention relates, in general, to joining workpieces together by a brazing process, and in particular, to a brazing process wherein a thermal heat shrink joining of the workpieces is achieved prior to, or simultaneous with, the braze joining of the workpieces.

BACKGROUND OF THE INVENTION

FIG. 1(a) and FIG. 1(b) illustrate a method of brazing cap 12 to an end of a tube or pipe 14. A sufficiently uniform joint clearance, $x_{jc}$, is required so that filler metal 16 will flow into the annular volume of the joint clearance when the filler metal is raised to liquidus temperature by heating the cap and pipe joint region.

Typically joint clearance, $x_{jc}$, is somewhere in the range of one to five thousandths of an inch around the entire annular region of the joint to achieve a satisfactory brazed joint. Maintaining these tolerances raises cap and pipe manufacturing quality control issues; tighter tolerances may require more expensive cap and pipe manufacturing equipment along with more expensive handling provisions.

It is one objective of the present invention to provide a process for satisfactorily braze joining articles without the requirement for maintaining a tight tolerance in the concentricity of adjacent regions of the workpieces to be joined in the joint clearance region, such as the concentricity of the inside sleeve fitting tube to be joined in the joint clearance region shown FIG. 1(a) and FIG. 1(b).

SUMMARY OF THE INVENTION

In one aspect the present invention is a braze joint, and method of making a braze joint between two articles, or workpieces, by forming an interior annular thermal shrink seating region, and an interior annular filler region inside the nominal cross section of the first article. The interior filler region has a larger cross sectional wall perimeter than the cross sectional wall perimeter of the interior seating region. An end of the second article is seated in the interior thermal shrink seating region by a thermal shrink process to form a suitable barrier between the interior filler region and the interior of the first article. Metal filler is placed around the outside perimeter of the second article above the filler region, and one, or both of the articles around the interior filler region are brought into the presence of heat so that the metal filler flows into at least a braze region between the wall of the inner filler region and the outer wall of the second article to establish the braze joint. One suitable but non-exclusive method of supplying the heat is to bring the articles around the filler region into the presence of a magnetic flux field to inductively heat at least one of the articles and melt the metal filler so that it flows at least into the braze region to establish the braze joint.

In another aspect the present invention is a braze joint, and method of making a braze joint between two articles, or workpieces, by forming an exterior annular thermal shrink seating region, and an exterior annular filler region within a nominal cross section of the first article. The exterior filler region has a smaller cross sectional wall perimeter than the cross sectional wall perimeter of the thermal shrink seating region. The interior wall of an end of the second article is seated around the thermal shrink region by a thermal shrink process to form a suitable barrier between the filler region and the exterior of the first article. Metal filler is placed around the inside perimeter of the second article above the filler region, and one, or both of the articles around the filler region are brought into the presence of heat so that the metal filler flows into at least a braze region between the wall of the exterior filler region and the inner wall of the second article to establish the braze joint. One suitable but non-exclusive method of supplying the heat is to bring the articles around the filler region into the presence of a magnetic flux field to inductively heat at least one of the articles and melt the metal filler so that it flows into the braze region to establish the braze joint.

In another aspect the present invention is a braze joint, and method of making a braze joint between two articles, or workpieces, by forming an exterior annular thermal shrink seating region within the nominal cross section of the first article. An inner annular filler region is formed within a nominal cross section of the second article and a suitable filler metal is placed within the filler region. The interior of an end of the second article is seated around the thermal shrink seating region by a thermal shrink process to form a suitable barrier between the filler region and the exterior of the first article. The two articles around the filler region are brought into the presence of heat so that the metal filler flows in at least the filler region to establish the braze joint. One suitable but non-exclusive method of supplying the heat is to bring the articles around the filler region into the presence of a magnetic flux field to inductively heat at least one of the articles and melt the metal filler so that it flows in at least the filler region to establish the braze joint.

In another aspect the present invention is a braze joint, and method of making a braze joint between two articles, or workpieces, by forming an outer annular filler region within a nominal cross section of the first article and placing a suitable filler metal within the filler region. The interior wall of an end of the second article is seated around the filler region of the first article by a thermal shrink process to establish a thermal shrink region that forms a suitable barrier between the filler region and the exterior of the first article. The two articles around the filler region are brought into the presence of heat so that the metal filler flows in at least the filler region to establish the braze joint. One suitable but non-exclusive method of supplying the heat is to bring the articles around the filler region into the presence of a magnetic flux field to inductively heat at least one of the articles and melt the metal filler so that it flows in at least the filler region to establish the braze joint.

In another aspect the present invention is a braze joint, and method of making a braze joint between two articles, or workpieces, by forming an inner annular filler region around a nominal inner cross section of the first article and placing a suitable filler metal within the filler region. The exterior wall of an end of the second article is seated around the filler region of the first article by a thermal shrink process to establish a thermal shrink region that forms a suitable barrier between the filler region and the interior of the first article. The two articles around the filler region are brought into the presence of heat so that the metal filler flows into at least the filler region to establish the braze joint. One suitable but non-exclusive method of supplying the heat is to bring the articles around the filler region into the presence of a magnetic flux field to inductively heat at least one of the articles and melt the metal filler so that it flows in at least the filler region to establish the braze joint.

In all examples of the present invention heat can be applied in the heat shrink or braze-joining process, for example, by electric induction, electric resistance, flame, or plasma heating. In some processes of the present invention, two or more of these heat shrink or brazing methods may be utilized in combination.

The above and other aspects of the invention are further set forth in this specification and the appended claims.

BRIEF DESCRIPTION OF THE DRAWINGS

For the purpose of illustrating the invention, there is shown in the drawings a form which is presently preferred. It being understood, however, that this invention is not limited to the precise arrangements and instrumentalities shown.

FIG. 7(a) through FIG. 7(d) illustrate another example of the present invention.

FIG. 8(a) through FIG. 8(d) illustrate another example of the present invention.

DETAILED DESCRIPTION OF THE INVENTION

While the present invention will be described in connection with a preferred embodiment, it will be understood that it is not intended to limit the invention to that embodiment. On the contrary, it is intended to cover all alternatives, modifications and equivalents as may be included within the scope of the invention.

The term "article" or "workpiece" as used herein generally refers to any elongated structural element, regardless of cross sectional shape, including, but not limited to, shafts, cylindrical pipes or tubing, and end caps attached to such pipes and tubing wherein the two articles or workpieces are joined together in a brazing process. At least one of the two articles must have a hollow interior, or at least a joint cavity, so that the end of the other article can be inserted into the article that is hollow or has a joint cavity, or so that the end of the article with the hollow interior, or joint cavity, can be inserted over the other article.

Figure 4:
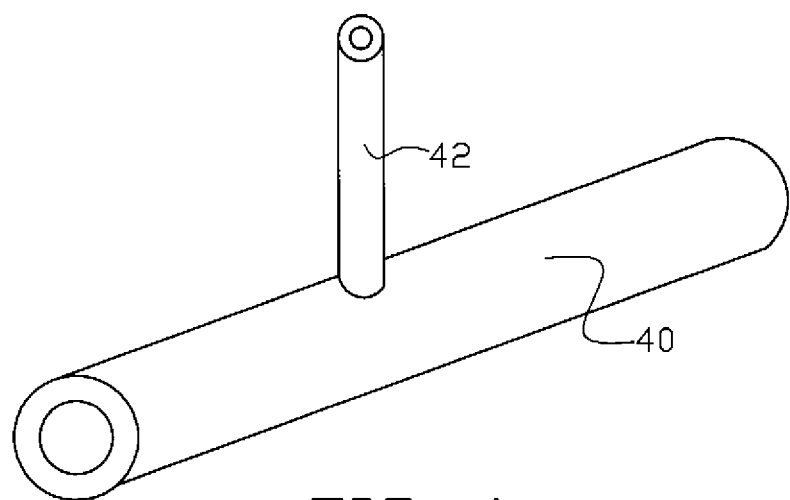
FIG. 4 illustrates another alternative arrangement of the present invention.

One example of where one of the articles has a joint cavity is shown in FIG. 4 where lateral tube or pipe 40 has a joint cavity to which riser tube or pipe 42 is brazed to the lateral pipe. The thermal shrink fit region and annular filler region can be formed in the wall of the lateral pipe (for example, in lieu of in the cap in the example shown in FIG. 2(a) through FIG. 2(d)) around the joint cavity into which the end of the riser pipe is inserted. If heated by electric induction, at least one of the two articles must be an electrically conductive material so that it can be inductively heated to raise the filler material to liquidus temperature.

Figure 1B:
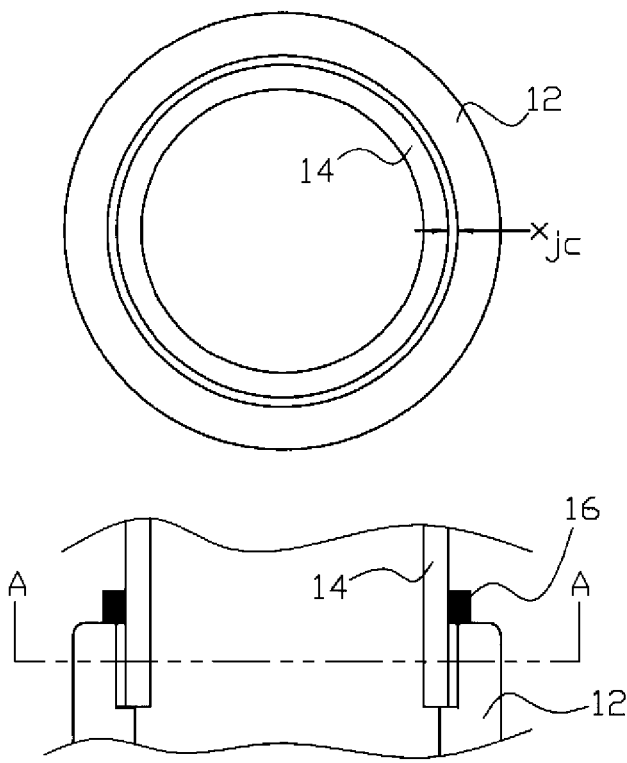
FIG. 1(a) and FIG. 1(b) illustrate a braze joint formed in a prior art brazing process.
Figure 1A:
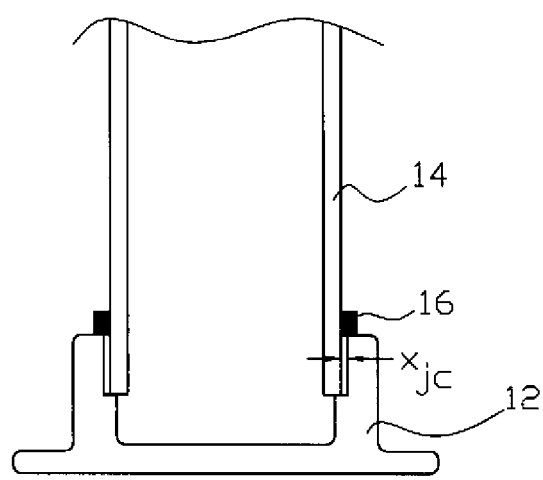
Figure 2A:
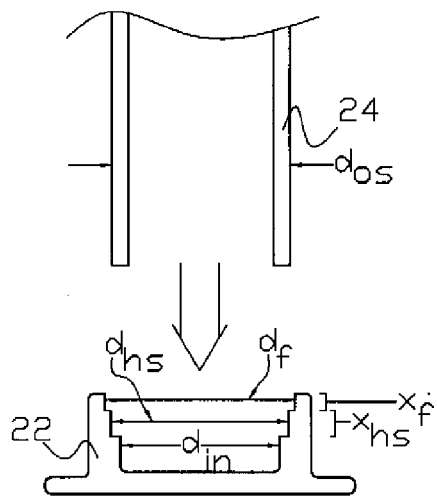
FIG. 2(a) through FIG. 2(d) illustrate one non-exclusive example of the present invention.

There is shown in FIG. 2(a) through FIG. 2(d) one example of the present invention wherein the first article (workpiece) is end cap 22, which is to be braze-joined to an end of a second article (workpiece), namely tube 24. Initially as shown in FIG. 2(a), an interior annular thermal shrink seating region $x_{hs}$, (interior seating region) and an interior annular filler region $x_f$ (interior filler region) are suitably formed inside of the cap with the cross sectional interior dimension $d_f$ (diameter in this example) of the filler region being greater than the cross sectional interior dimension $d_{hs}$ of the thermal shrink seating region, and the nominal inside cross sectional dimension $d_{in}$ (diameter in this example of cap 22) being less than that of the thermal shrink seating region. The step of forming the thermal shrink seating region and/or the filler region may be accomplished either in original fabrication of the first article (cap), or as an initial step in the brazing process, since the tolerance requirement for this filler region is less than that described above relative to prior art FIG. 1(a) and FIG. 1(b); that is, the filler region cross sectional dimension may be greater than that of the joint clearance in prior art FIG. 1(a) and FIG. 1(b).

Figure 2C:
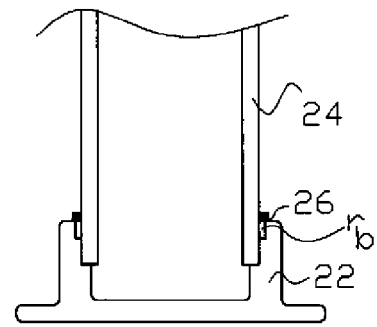
Figure 2B:
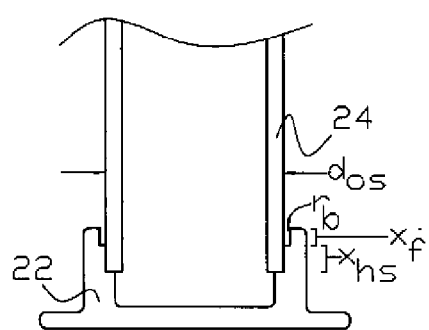

A suitable thermal shrink process is applied to seat the end of tube 24 into thermal shrink seating region $x_{hs}$ as shown in FIG. 2(b), with the end of the outer wall of the second article fitted against the wall of the interior seating region. This process step may be accomplished either with the brazing process, or at any earlier time. In the present invention the thermal shrink interference fit between the outer wall of the second article and the wall of the interior seating region is sufficient to provide a substantially liquid barrier between the braze region (between the outer wall of the second article and the wall of the filler region) and the inside volume of the cap that blocks the free flow of liquids. That is, the thermal shrink fit need not be accomplished in a manner where the thermal shrink fit provides additional strength to the resulting brazed joint. Typical shrink fit differences are on the order of 0.004 inches in circumference; the thermal shrink seating region's wall circumference $d_{hs}$ is larger than the outer circumference $d_{os}$ of the second article by an amount that is based on: the materials to be joined; the tolerances that can be maintained; and the thermal expansion achieved during brazing and shrink fitting.

Figure 2D:
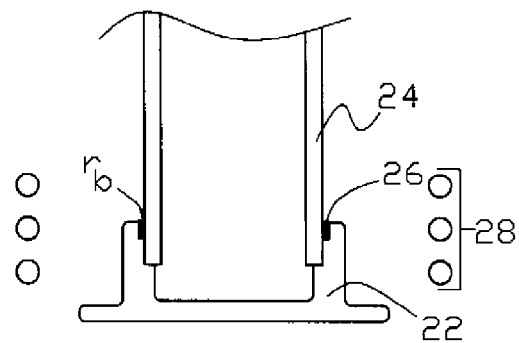

In FIG. 2(c) filler metal 26 is applied around the outer diameter of pipe 24, and the cap and/or tube end in the vicinity of the braze region between the outer wall of the second article and the inner wall of the filler region $x_f$ is brought within the vicinity of heat, either by a magnetic flux field created, for example, by the flow of alternating current through one or more induction coils 28, or by some other heating process, so that the filler metal becomes liquidus and flows into at least the braze region $r_b$ defined within the interior annular filler region $x_f$ as shown in FIG. 2(d). When the joint region is removed from the heat, and the joint region cools, the solidified metal filler forms a satisfactory braze joint in the braze region as shown in FIG. 2(d).

By the process of the present invention a satisfactory braze joint is achieved by first establishing the thermal shrink fit in the interior annular thermal shrink seating region $x_{hs}$ to form a barrier to the free flow of filler metal when it reaches liquidus temperature.

Figure 3:
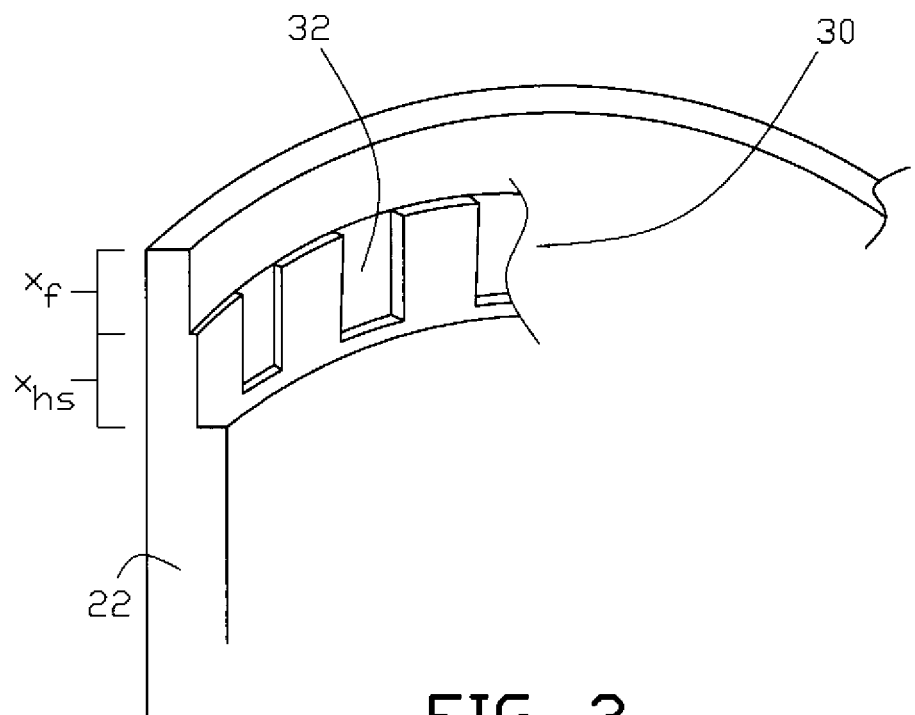
FIG. 3 illustrates one alternative arrangement of the present invention.

Alternatively the side wall 30 of the interior annular thermal shrink seating region $x_{hs}$ may have one or more cutouts 32 as shown in FIG. 3 that establish controlled flow regions for the liquid metal filler to further strengthen the braze joint by extending the length of the braze joint along the length of the first article (cap). Cutouts may also be provided at the end of the outer wall of pipe 24. This makes the brazed joint more withstandable to rotational forces applied around the central longitudinal axis of the cap and tube end joint. Further the cutouts can provide a passage for any gaseous byproducts from the brazing process, along with air that is displaced during the liquefaction and flow of the filler metal as it approaches and reaches liquidus temperature. The cutouts shown in FIG. 3 are only one example of passages in side wall 30. For example the passages can also be capillary drill holes or microscopic channels in side wall 30.

Figure 5A:
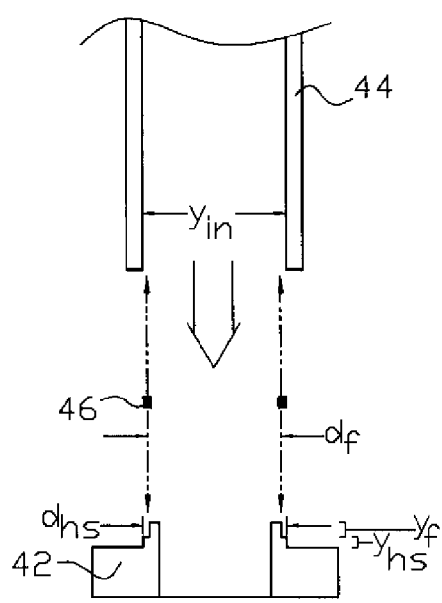
FIG. 5(a) through FIG. 5(c) illustrate another example of the present invention.
Figure 5B:
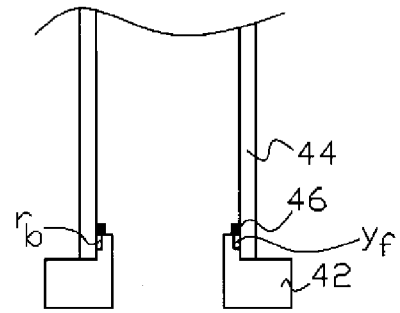
Figure 5C:
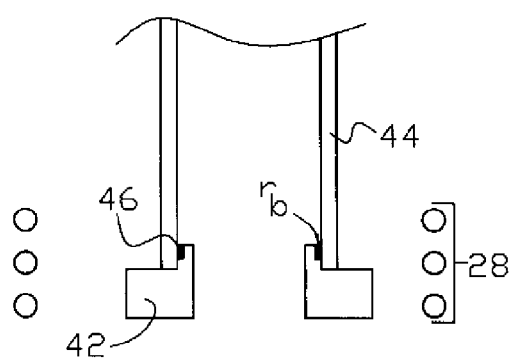

There is shown in FIG. 5(a) through FIG. 5(c) another example of the present invention wherein the first article (workpiece) is fitting 42, which is to be braze joined to the end of a second article, namely tube 44. In this example, fitting 42 is joined to the inner wall (inside diameter $y_{in}$) of the tube. As shown in FIG. 5(a) fitting 42 is suitably formed with an outer annular thermal shrink seating region $y_{hs}$ (exterior seating region) and an outer annular filler region $y_f$ (exterior filler region). The cross sectional outer dimension $d_f$ (diameter in this example) of the outer filler region $y_f$ is less than the cross sectional dimension $d_{hs}$ of the outer thermal shrink seating region $y_{hs}$. The step of forming the thermal shrink seating region and/or the filler region may be accomplished either in original fabrication of the fitting, or as an initial step in the brazing process.

A suitable thermal shrink process is applied to seat the inner wall (inside diameter $y_{in}$) of the end of the tube 44 over the wall of thermal shrink seating region $y_{hs}$ as shown in FIG. 5(b). This process step may be accomplished either with the brazing process, or at any earlier time. In the present example of the invention, the thermal shrink interference fit between the inner wall of the second article and the wall of the exterior seating region is sufficient to provide a substantially liquid barrier between the braze region (between the inner wall of the second article and the wall of the filler region $y_f$) and the exterior of the first article that blocks the free flow of liquids. That is, the thermal shrink fit need not be accomplished in a manner where the thermal shrink fit provides additional strength to the resulting brazed joint. Typical shrink fit differences are on the order of 0.004 inches in circumference; the thermal shrink seating region's wall circumference $d_{hs}$ of the first article is larger than the inner circumference $y_{in}$ of the second article by an amount that is based on: the materials to be joined; the tolerances that can be maintained; and the thermal expansion achieved during brazing and shrink fitting.

Filler metal 46, which can be, for example annular in shape, is applied around the inner wall (inside diameter) of fitting 44, adjacent to the braze region, either before or after the thermal shrink process. Then the fitting and/or the tube end in the vicinity of the filler region $y_f$ is brought within the vicinity of heat either by a magnetic flux field created, for example, by the flow of alternating current through one or more induction coils 28, or by some other process, so that the filler metal becomes liquidus and flows at least into the braze region $r_b$ as shown in FIG. 5(c). When the joint region is removed from the heat and the joint region cools the solidified metal filler forms a satisfactory braze joint in the filler region as shown in FIG. 5(c).

By the process of the present invention a satisfactory braze joint is achieved by first establishing the thermal shrink fit over the wall of the outer thermal shrink seating region $y_{hs}$ to form a sufficient barrier to the free flow of filler metal when it reaches liquidus temperature.

Figure 6A:
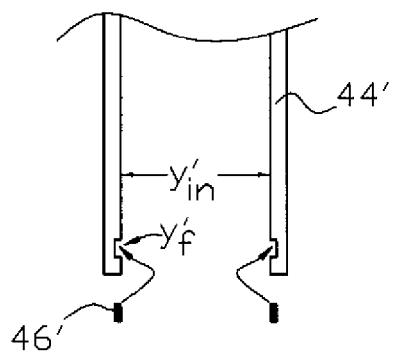
FIG. 6(a) through FIG. 6(d) illustrate another example of the present invention.
Figure 6C:
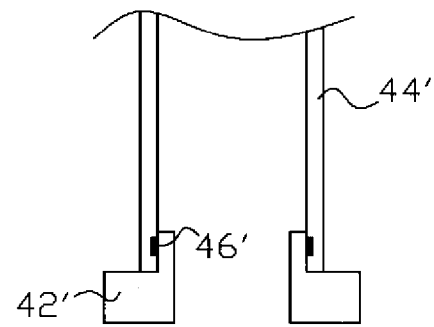
Figure 6B:
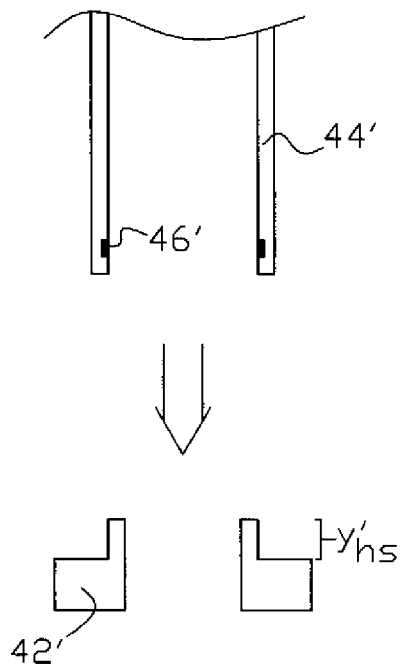

FIG. 6(a) through FIG. 6(d) illustrate another example of the invention wherein the interior of the end of tube 44' is heat shrunk over an exterior circumferential region of fitting 42'. In this example, annular filler region $y'_f$ is formed within the inner diameter of tube 44', as opposed to in the fitting 42 as shown in FIG. 5(a) through FIG. 5(c). As shown in FIG. 6(b), fitting 42' is suitably formed with an outer annular thermal shrink seating region $y'_{hs}$. The step of forming the thermal shrink seating region and/or the filler region may be accomplished either in original fabrication of the fitting and/or tube, or as an initial step in the brazing process.

A suitable thermal shrink process is applied to seat the inner wall (inside diameter $y'_{in}$) of tube 44' over the wall of thermal shrink seating region $y'_{hs}$ as shown in FIG. 6(c). This process step may be accomplished either with the brazing process, or at any earlier time. In the present invention the thermal shrink fit is sufficient to provide a substantially liquid barrier between the filler region and the exterior of fitting 42' that blocks the free flow of liquids. That is, the thermal shrink fit need not be accomplished in a manner where the thermal shrink fit provides additional strength to the resulting brazed joint.

Figure 6D:
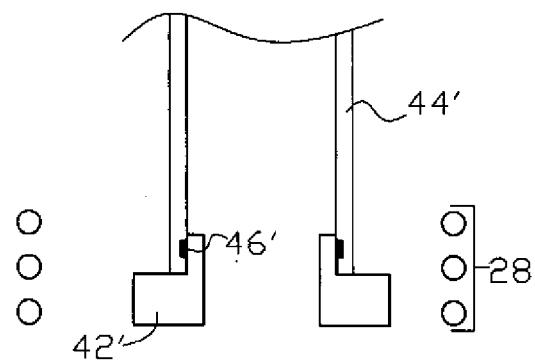

Filler metal 46', which can be, for example, annular in shape, is positioned in filler region $y'_f$ within the insider diameter of tube 44', before, or during, the thermal shrink process, and the fitting and tube end in the vicinity of the filler region $y'_f$ is brought within the vicinity of heat either by a magnetic flux field created, for example, by the flow of alternating current through one or more induction coils 28, or by some other process, so that the filler metal becomes liquidus and flows at least in the annular filler region $y'_f$ as shown in FIG. 6(d). When the joint region is removed from the heat and the joint region cools the solidified metal filler forms a satisfactory braze joint in at least the filler region as shown in FIG. 6(d).

By the process of the present invention a satisfactory braze joint is achieved by first establishing the thermal shrink fit over the wall of the outer annular thermal shrink seating region $y'_{hs}$ to form a sufficient barrier to the free flow of filler metal when it reaches liquidus temperature.

There is shown in FIG. 7(a) through FIG. 7(d) another example of the present invention wherein the first article is fitting 52, which is to be braze-joined to a second article, namely tube 54. In this example, fitting 52 is joined to the inner wall (inside diameter $z_{in}$) of the tube. As shown in FIG. 7(a) an outer annular filler region $z_f$ is suitably formed within fitting 52. The step of forming the filler region may be accomplished either in original fabrication of the fitting, or as an initial step in the brazing process.

Filler metal 56, for example in the form of an annular ring, is suitably positioned within filler region $z_f$ as shown in FIG. 7(b). Tube 54 is suitably expanded, for example by application of heat from a suitable source, to an inside diameter $z_{exp}$ (larger than ambient temperature diameter $z_{in}$) as shown in FIG. 7(b) so that fitting 52 can be inserted into tube 54. Insertion may be accomplished by movement of either the tube or fitting, or both the tube and fitting. As shown in FIG. 7(c), upon cooling, the inside diameter $z_{in}$ of tube 54 shrink fits around the outer diameter of fitting 52 for thermal shrink region $z_{hs}$ which includes at least filler region $z_f$. Filler metal 56 is compressed within the filler region as shown in the enlarged detail associated with FIG. 7(c). This thermal shrink process step may be accomplished either with the brazing process, or at any earlier time. The thermal shrink fit may be sufficient to provide a substantially liquid barrier between the filler region $z_f$ and the outside diameter of fitting 52 that blocks the free flow of liquids. That is, the thermal shrink fit need not be accomplished in a manner where the thermal shrink fit provides additional strength to the resulting brazed joint.

Fitting 52 and/or tube 54 around the filler region $z_f$ are brought into the vicinity of a heat source, for example, induced heat from the flow of alternating current in induction coil 28, so that filler metal 56 becomes liquidus and flows at least in the annular filler region $z_f$. When the joint region is removed from the heat and the joint region cools, the solidified metal filler forms a satisfactory braze joint in at least the filler region as shown in FIG. 7(d).

Alternatively as shown in FIG. 7(b)' a compression filler metal 56' may be fitted within annular filler region $z_f$ in lieu of filler 56 in FIG. 7(b) while the other process steps generally remain the same.

By the process of the present invention a satisfactory braze joint is achieved by first establishing the thermal shrink fit over the outer annular thermal shrink seating region $z_{hs}$ to form a sufficient barrier to the free flow of the filler metal when it reaches liquidus temperature.

There is shown in FIG. 8(a) through FIG. 8(d) another example of the present invention wherein the first article is fitting 52', which is to be braze-joined to a second article, namely tube 54'. This example is generally similar to the example shown in FIG. 7(a) through FIG. 7(d) except that fitting 52' is joined to the outside diameter of the tube. As shown in FIG. 8(a) an inner annular filler region $z'_f$ is suitably formed within fitting 52'. The step of forming the filler region may be accomplished either in original fabrication of the fitting, or as an initial step in the brazing process.

Filler metal 57, for example in the form of an annular ring, is suitably positioned within filler region $z'_f$ as shown in FIG. 8(b). At least the end region of fitting 52' with filler region $z'_f$ is suitably expanded, for example by application of heat from a suitable source, to an inside diameter $z'_{exp}$ (larger than ambient temperature diameter $z'_{in}$) as shown in FIG. 8(b) so that tube 54' can be inserted into fitting 52'. Insertion may be accomplished by movement of either the tube or fitting, or both the tube and fitting. As shown in FIG. 8(c) upon cooling, the inside diameter $z'_{in}$ of fitting 52' shrink fits around the outer diameter of tube 54' for thermal shrink region $z'_{hs}$, which includes at least filler region $z'_f$. Filler metal 57 is compressed within the filler region as shown in the enlarged detail associated with FIG. 8(c). This thermal shrink process step may be accomplished either with the brazing process, or at any earlier time. The thermal shrink fit may be sufficient to provide a substantial liquid barrier between the filler region $z'_f$ and the inside diameter of fitting 52' that blocks the free flow of liquids. That is, the thermal shrink fit need not be accomplished in a manner where the thermal shrink fit provides additional strength to the resulting brazed joint.

Fitting 52' and/or tube 54' around the filler region $z'_f$ are brought into the vicinity of a heat source, for example, induced heat from the flow of alternating current in induction coil 28, so that metal filler 57 becomes liquidus and flows at least in the annular filler region $z'_f$. When the joint region is removed from the heat and the joint region cools the solidified metal filler forms a satisfactory braze joint in at least the filler region as shown in FIG. 8(d).

Alternatively as shown in FIG. 8(b)' a tension filler metal 57' may be fitted within annular filler region $z'_f$ in lieu of filler 57 in FIG. 8(b) while the other process steps generally remain the same.

By the process of the present invention a satisfactory braze joint is achieved by first establishing the thermal shrink fit over the outer annular thermal shrink seating region $z'_{hs}$ to form a barrier to the free flow of the filler metal when it reaches liquidus temperature.

The filler metal in any example of the invention may be of any suitable form and composition as required for a particular application of braze joining. While the annular braze or filler region in the above examples of the invention is continuous around the article in which it is formed, in other examples of the invention the filler region may be segmented and non-continuous around the article in which it is formed.

In the above examples of the invention the braze joint is formed primarily in the braze region, or filler region. In some examples of the invention liquid filler metal may also partially flow into capillaries within the shrink fit tolerance adjacent to the braze region or filler region to extend the braze joint beyond the braze region or filler region.

In all examples of the invention cutouts in one, or both of the walls in the heat shrink region adjacent to the braze region, or filler region may be provided to establish controlled flow regions of the liquid metal filler from the braze or filler region to further strengthen the braze joint by extending the length of the braze joint, or to provide a passage for any gaseous byproducts from the brazing process, along with air that is displaced during the liquefaction and flow of the filler metal as it approaches and reaches liquidus temperature, as generally described above.

In the above examples of the invention the thermal shrink process step is described as a heat shrink process. In other examples of the invention, the thermal shrink process step may be a cooling shrink process where one of the workpieces is cooled to contract and then allowed to expand to achieve the thermal shrink fit with the other workpiece.

The present invention may be embodied in other specific forms without departing from the spirit or essential attributes thereof. The above examples of the invention have been provided merely for the purpose of explanation, and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. A method of braze joining a first workpiece to a second workpiece, the method comprising the steps of:
   forming an interior seating region in the first workpiece;
   forming an interior filler region adjacent to the interior seating region, the interior perimeter of the interior filler region being greater than the inner perimeter of the interior seating region;
   forming one or more cutout regions in the wall of the interior seating region;
   thermal shrink fitting an end of the second workpiece into the interior seating region to form a thermal shrink fit region between the outer wall of the second workpiece and the wall of the interior seating region with the one or more cutout regions;
   applying a filler metal around the outer wall of the second workpiece adjacent to the interior filler region; and
   heating the filler metal to flow the filler metal into at least a braze region between the outer wall of the second workpiece and the wall of the interior filler region, and at least partially into the one or more cutout regions in the wall of the interior seating region.

2. The method of claim 1 wherein the step of thermal shrink fitting the end of the second workpiece into the interior seating region comprises inductively heating at least the interior seating region of the first workpiece and inserting the end of the second workpiece into the interior seating region, and the step of heating the filler metal to flow the filler metal into at least the braze region between the outer wall of the second workpiece and the wall of the interior filler region, and at least partially into the one or more cutout regions in the wall of the interior seating region comprises inductively heating at least the second workpiece adjacent to the interior filler region.

* * * * *